United States Patent
Aggarwal et al.

(10) Patent No.: US 8,146,083 B2
(45) Date of Patent: Mar. 27, 2012

(54) METHOD AND APPARATUS TO MODIFY A TASK WITHIN A SET OF TASKS

(75) Inventors: Vijay Kumar Aggarwal, Austin, TX (US); Scott Stephen Dickerson, Austin, TX (US); Adam Reudeau Holley, Austin, TX (US); Chakkalamattam Jos Paul, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1679 days.

(21) Appl. No.: 11/425,892

(22) Filed: Jun. 22, 2006

(65) Prior Publication Data

US 2007/0300224 A1    Dec. 27, 2007

(51) Int. Cl.
   *G06F 9/46*  (2006.01)
   *G06Q 10/00*  (2006.01)
(52) U.S. Cl. ........ 718/100; 705/7.12
(58) Field of Classification Search .......... None
   See application file for complete search history.

(56) References Cited

U.S. PATENT DOCUMENTS

| | | | |
|---|---|---|---|
| 2004/0044628 A1* | 3/2004 | Mathew et al. | 705/51 |
| 2004/0176968 A1* | 9/2004 | Syed et al. | 705/1 |
| 2005/0137926 A1* | 6/2005 | Zhang et al. | 705/9 |
| 2006/0136922 A1* | 6/2006 | Zimberg et al. | 718/100 |
| 2007/0256050 A1* | 11/2007 | Behnia et al. | 717/104 |

OTHER PUBLICATIONS

Kloppmann et al., "WS-BPEL Extension for People-BPEL4People, a Joint White Paper by IBM and SAP Jul. 2005", SAP AG and International Business Machines Corp. 2005, pp. 1-18.

* cited by examiner

*Primary Examiner* — Kenneth Tang
(74) *Attorney, Agent, or Firm* — Yee & Associates, P.C.; Jeffrey S. LaBaw (57) ABSTRACT

A computer implemented method, apparatus, and computer usable program product for processing tasks. A set of one or more tasks is presented on a user interface, wherein the set of tasks are part of a process. A set of one or more policies are associated. Each respective policy is associated with one or more of the set of tasks in which at least one of the tasks in the set of tasks is associated with a policy restricting modification of the task. The set of tasks and set of policies are sent to a flow engine, wherein the flow engine enforces performance of the set of tasks according to the set of policies.

26 Claims, 10 Drawing Sheets

- POLICY NAME: 902 — CRITICAL
- CORPORATE GUIDELINE: ITCS 300 — 904
- VALID TASK TYPES: APPROVALS — 906

- TASK/FIELD ACTION: 908 — NAME
- USERS THAT POSSESS THIS RIGHT: 910 — PROCESS OWNERS
- ADD — 912

POLICY RULES  DELETE (922)  EDIT (920)

| SELECT | TASK FIELD/ACTION | USERS WITH RIGHTS |
|--------|-------------------|-------------------|
| ○ | NAME | PROCESS OWNERS — 916 |
| ○ | DELETE | PROCESS OWNERS — 918 |
| ○ | | |

914

924 — APPLY    CANCEL — 926

FIG. 9B 930

TASK EDIT PANEL

☑ MANDATORY    NAME
932              934

FIG. 10A

My ITSM Process Activities

Description: Browse and work with your ITSM Activities. Click on the activity name to view details of or edit an activity.

My Activities

Filter by: [All My Activities ▼]  [Apply Filter]

1004   1006                                                   1008

| Select | Activity | Process Type | Process | State | Progress | Auto start | |
|---|---|---|---|---|---|---|---|
| ○ | • Approve and Schedule Major Change | Change Management | ⊕ new rfc | △▷ | ▓ 0% | ⌇ | |
| ○ | • Assess Major Change | Change Management | ⊕ new rfc | ▲▷ | ▓ 14% | ⌇ | |
| ○ | • Coordinate Change Implementation | Change Management | ⊕ new rfc | △▷ | ▓ 0% | ⌇ | Ready... |
| ○ | • Design and Build Patch Release | Change Management | ⊕ new release | △▷ | ▓ 0% | ⌇ | |
| ○ | • Distribute and Install Patch Release | Change Management | ⊕ new release | △▷ | ▓ 0% | ⌇ | |

Page 1 of 1    Total: 9  Displayed: 9  Selected: 1

1010

Sidebar:
- ⊟ Process Management
  - My ITSM Tasks
  - Work With Activities
  - Work With Process Templates
  - Work With Activity Templates
- ⊟ Change Management
  - Create a Request for Change
  - Accept and Categorize RFCs
  - Work With RFCs
  - Work With Change Policy
  - Change Administration
  - Forward Schedule of Change
- ⊟ Release Management
  - Create a New Release
  - Work With Releases
  - Work With Release Policies
  - Master Release Calendar
  - Configure Tools
  - Add Software Package to DSL Catalog 1000
1002

METHOD AND APPARATUS TO MODIFY A TASK WITHIN A SET OF TASKS

BACKGROUND OF THE INVENTION

1. Field of the Invention

The present invention relates generally to an improved data processing system and in particular, to a method and apparatus for processing a sequence of tasks. Still more particularly, the present invention relates to a computer implemented method, apparatus, and computer usable program code for identifying when variances to a set of tasks may occur.

2. Description of the Related Art

Businesses and other types of organizations employ processes to achieve goals. For example, a business in the information technology area may have a series of workflows or processes that are used to install, maintain, and update networks and components within networks. A process may include a set of one or more activities. An activity contains a set of one or more tasks. For example, in a process for upgrading a network, one activity may be to patch software on computers, while another activity in the process may be to upgrade firmware on routers in the network. Of course, other activities also may occur in upgrading a network.

For example, a series of activities may be defined for installing a program on a computer. For maintenance issues, a series of activities may be defined to identify problems on a computer system. Each activity in the process has a set of one or more tasks. In another example, updating firmware on a router may include tasks, such as identifying the correct firmware upgrade, receiving authorization to take the router offline for the upgrade, performing the firmware upgrade, and verifying that the new firmware has been correctly installed on the router.

Often times, these activities have tasks that should not be changed or omitted to ensure that the goal of the activities are correctly reached. For example, certain tasks may be implemented to ensure quality. Omissions of these types of tasks are prohibited to avoid quality control issues.

In determining whether the tasks have been completed as set out, a number of different mechanisms are currently available. One mechanism involves using a spreadsheet or database in which tasks are identified and the completion of the tasks are logged when they are completed. This type of hand entry does not provide for any type of real enforcement as to whether the tasks actually occurred. Another currently used system involves the use of software to ensure that tasks have been completed. With respect to the area of information technology, server changes, installation of software, and other steps like these may be enforced through tool sets, which require the user to complete tasks as set out for the users.

An example of such a tool is the WebSphere Business Server Foundation, which is available from International Business Machines Corporation. This type of tool uses business process execution language (BPEL), which is a extensible markup language (XML) based system. This type of tool provides an ability to enforce the execution of tasks.

On the other hand, this tool is inflexible and requires recoding of tasks in BPEL when changes are desired. For example, if a user desires to add or remove a task, the user is required to obtain the BPEL file, change the coding in the file, replace the file, then install the file for use. These steps require time and knowledge of the coding language. Often times, managers are unfamiliar with the language or do not have time to actually make these types of changes. Therefore, the flexibility of this type of system is limited.

SUMMARY OF THE INVENTION

The present invention provides a computer implemented method, apparatus, and computer usable program product for processing tasks. A set of one or more tasks is presented on a user interface, wherein the set of tasks are part of a process. A set of one or more policies are associated. Each respective policy is associated with one or more of the set of tasks in which at least one of the tasks in the set of tasks is associated with a policy restricting modification of the task. The set of tasks and set of policies are sent to a flow engine, wherein the flow engine enforces performance of the set of tasks according to the set of policies.

A determination is made as to whether a task can be modified based on a policy associated with the task in response to a request to modify a task. Responsive to a determination that the task can be modified, the request to modify the task is performed.

A set of one or more tasks is presented on a user interface, wherein the set of tasks are part of a process. A set of one or more policies are associated. Each respective policy is associated with one or more of the set of tasks in which at least one of the tasks in the set of tasks is associated with a policy restricting modification of the task. The set of tasks and set of policies are sent to a flow engine, wherein the flow engine enforces performance of the set of tasks according to the set of policies.

A determination is made as to whether a task can be modified based on a policy associated with the task in response to a request to modify a task. Responsive to a determination that the task can be modified, the request to modify the task is performed.

In performing the request to modify the task, a new policy may be associated with the task in place of the policy. In performing the request to modify the task, the task may be deleted or delegated to a user. Further, in performing the request to modify the task, a completion date may be changed for the task.

The set of tasks may be presented on a user interface by placing the set of tasks in a list on a Web page and sending the Web page to a browser. In determining whether the task can be modified based on a policy associated with the task, a policy identifier may be identified for the task, the policy is located for the task from using the identifier, and the policy is processed to obtain a result identifying whether the task can be modified. In the illustrative embodiments, the policy may specify that only a selected set of users can modify the task.

In the illustrative embodiments, templates are stored for the tasks in a database, and policies for determining whether the tasks can be modified are stored in the database. With these templates, a new set of tasks may be instantiated using the templates and the policies, wherein the new set of tasks is for a different process. This feature allows for repeatable use of tasks and policies for future processes and activities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
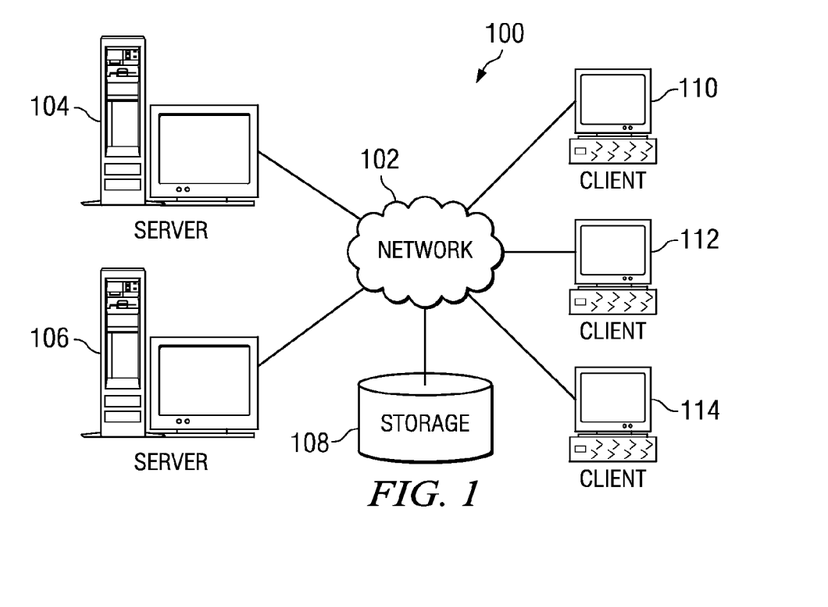
FIG. 1 is a pictorial representation of a network of data processing systems in which illustrative embodiments may be implemented.
Figure 2:
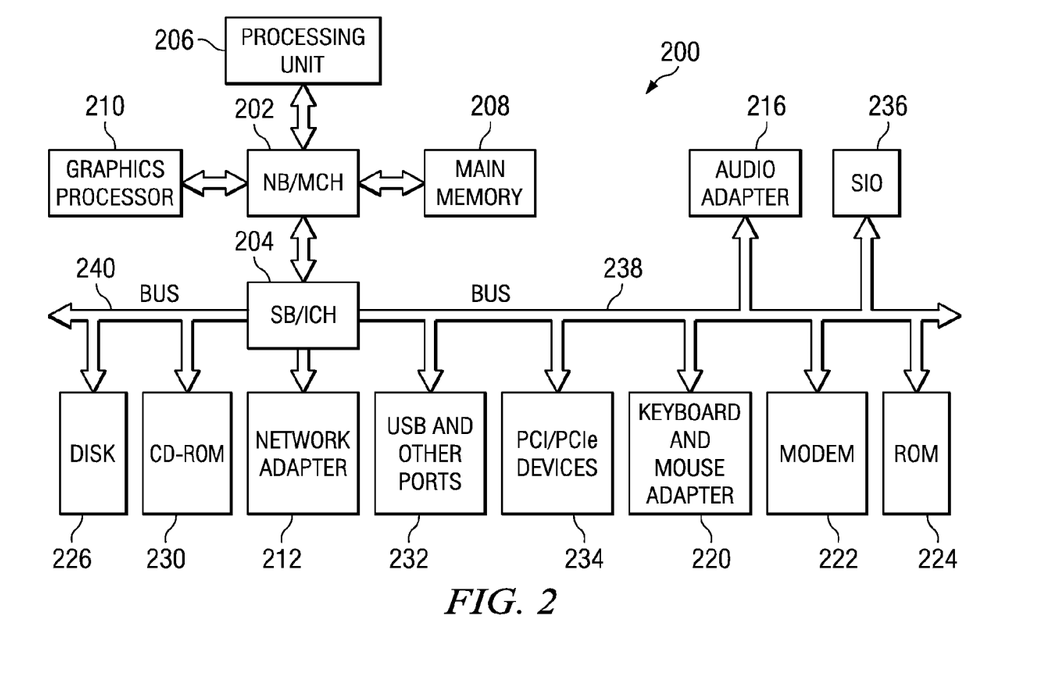
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. Network data processing system 100 may be used to implement processes used to manage tasks in accordance with an illustrative embodiment.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for ensuring compliance with different tasks in a set of tasks. A set of tasks may be one or more tasks that are for one or more activities in these examples. Further, the illustrative embodiments also allow for flexible modification of tasks depending on the different policies and requirements.

In these examples, templates are provided for tasks and activities that run on a workflow engine to represent different possible process flows in an organization. With these templates, a user is able to mark certain tasks as mandatory tasks, which constrain the ability of users to modify the different tasks that make up activities for a process.

Figure 3:
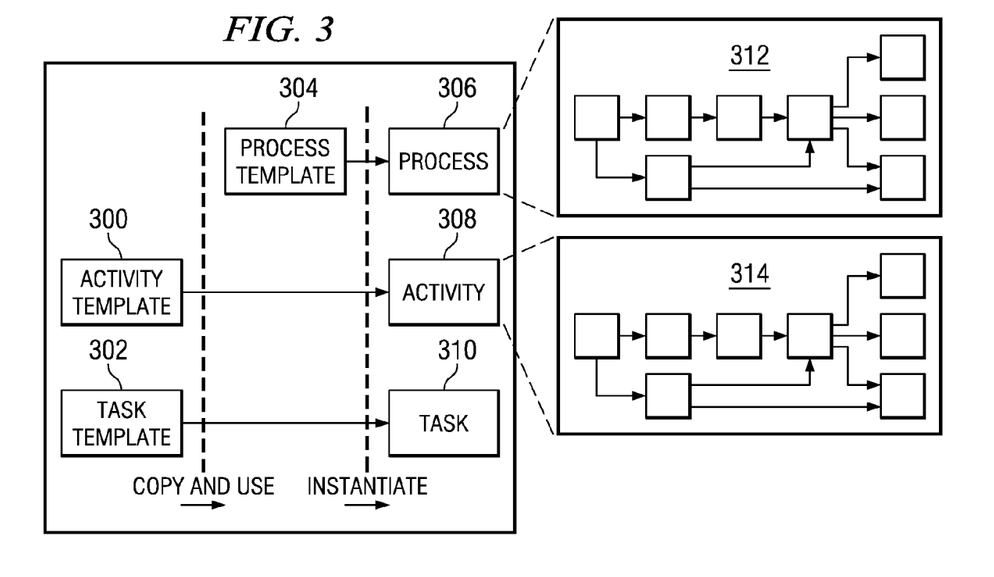
FIG. 3 is a diagram illustrating templates and instances in accordance with an illustrative embodiment.

Turning now to FIG. 3, a diagram illustrating templates and instances is depicted in accordance with an illustrative embodiment. In this example, activity template 300, task template 302, and process template 304 are present. Process template 304 may be instantiated to generate process 306 when it is desired to actually start execution of a process. In these examples, activity template 300 is instantiated to start activity 308 in this example. In a similar fashion, task template 302 may be instantiated as task 314. Graph 312 shows a number of different activities and the interconnection between those activities for process 306. Graph 314 illustrates tasks that make up activity 308. These different tasks may be identified using a task template, such as task template 302.

In these illustrative examples, activity template 300 and task template 302 may include indications as to whether tasks are to be performed based on a policy. This policy determines whether a particular task must be performed or whether any modifications may be made in performing the task.

Further, this type of ability to mark tasks allows flexibility for persons performing the work, but also allows for policy enforcement. In these illustrative examples, mandatory tasks cannot be removed. As a result, these types of tasks must be completed as part of the process. However, in these examples, a user is free to add additional tasks as required. Also, users in an organization also may modify an aspect of a task to help accomplish the task. For example, the user may assign the task to an owner, and adjust the schedule of a task. However, only a manager may change the type and name of a mandatory task. Of course, this type of flexibility may be constrained depending on the particular implementation. In the illustrative embodiments, the capability to set a task as mandatory and associate a policy with the task can also be performed when creating activity templates for the task templates.

Figure 4:
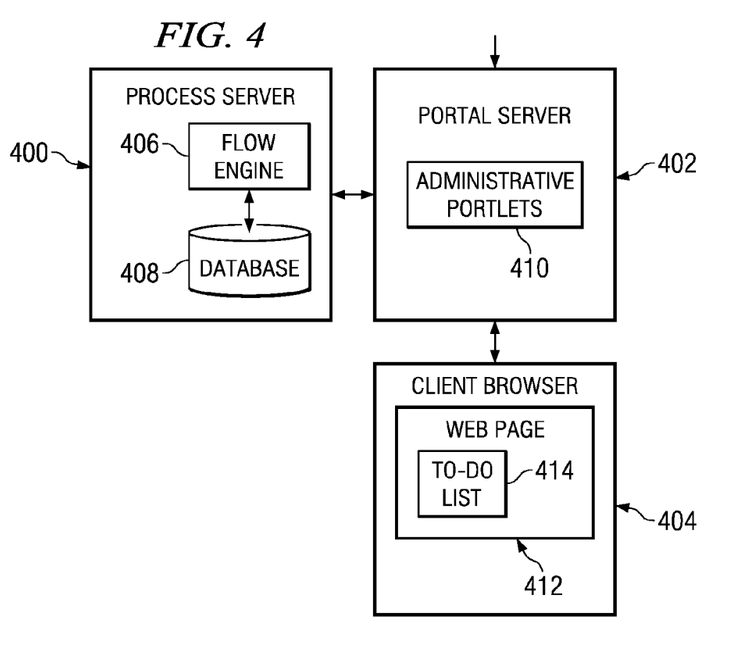
FIG. 4 is a diagram illustrating components used in processing tasks in accordance with an illustrative embodiment.

Turning now to FIG. 4, a diagram illustrating components used in processing tasks is depicted in accordance with an illustrative embodiment. In this example, tasks are handled through process server 400, portal server 402, and client browser 404. Process server 400 and portal server 402 may be implemented using servers, such as server 104 or server 106 of FIG. 1. Process server 400 and portal server 402 may be on different data processing systems or on the same data processing system, depending on the particular implementation. Client browser 404 may be executing on a client such as client 110 in FIG. 1.

Process server 400 contains flow engine 406 and database 408. Flow engine 406 is used as an interface to decide which tasks are to be executed depending on the completion of tasks. Further, flow engine 406 identifies or receives notifications of when tasks fail and provide the appropriate notifications to users. Flow engine 406 acts as a conduit between tasks and information stored in database 408 and the handling of those tasks through process server 400.

In these examples, database 408 contains templates for tasks, activities, and processes. Further, database 408 also includes other information needed to determine what tasks should be initiated as well as storing status information on different tasks. Database 408 may be located on the same data processing system as flow engine 406 or on a remote data processing system. Further database 408 is illustrated as a single database, but may include different databases located in different locations depending on the particular implementation.

Portal server 402 contains administrative portlets 410. A portlet is a pluggable user interface component that is used to manage and display information for a Web portal. Portlets produce fragments of markup code that are placed into a portal page that is sent to a browser, such as client browser 404. A Web page sent to a client may contain information or content from a number of different portlets. In these examples, administrative portlets 410 are portlets that are used to generate and display tasks and provide interfaces to modify or update tasks.

In particular, administrative portlets 410 provide for the presentation and execution of tasks through client browser 404. Further, in these illustrative examples, whether fields are modifiable or whether tasks may be deleted or changed are controlled through administrative portlets 410 based on information obtained from database 408. The information is a policy and other data in these examples. Of course, depending on the particular implementation, whether tasks may be deleted or changed may be controlled through flow engine 406.

A user at client browser 404 receives Web page 412 from portal server 402 through administrative portlets 410. This Web page includes to-do list 414. This list is, in essence, a set of tasks to be performed for an activity in a process. The tasks presented in Web page 412 are presented using administrative portlets 410. The particular tasks are identified from database 408 for the particular user in these examples. This process occurs when the user logs on to portal server 402. Administrative portlets 410 sends the user identification to flow engine 406. Flow engine 406 identifies tasks for the user in database 408. These tasks are returned to administrative portlets 410. In turn, these portlets generate Web page 412, which contains to-do list 414. The user performs these tasks through interaction with Web page 412 in these examples. Depending on the type of tasks involved, a software system or application may be used to implement these tasks.

In these illustrative examples, certain tasks in to-do list 414 are considered mandatory. In other words, the user may not skip these tasks. By being mandatory, other constraints may occur. For example, the user may or may not be able to delegate the tasks to someone else. In another example, the user may or may not be able to change certain parameters in the task. Depending on the particular implementation, the user may be able to make changes to various parameters needed to complete the task. Various rules covering these changes and whether tasks are mandatory are identified in database 408 in these examples.

In these examples, a number of different users may generate processes, tasks, and activities as well as perform tasks. In these examples, a process owner and an activity owner are examples of two types of users. The process owner ensures compliance with policies for the organization. As a result, this type of user is interested in ensuring that tasks set as mandatory are performed and not skipped by an activity owner. The activity owner is a user that modifies and performs tasks, and may assign tasks to other task owners. Task owners typically claim and report the results of a task assigned to that particular owner.

Figure 5:
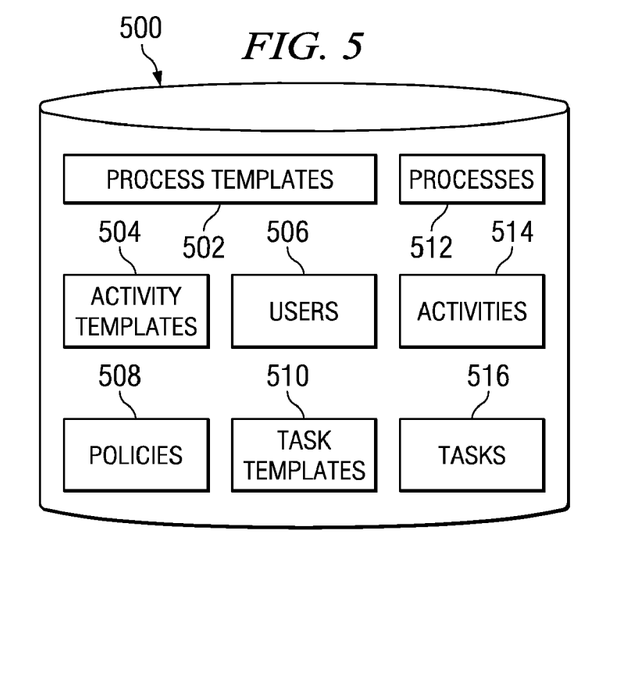
FIG. 5 is a diagram of a database in accordance with an illustrative embodiment.

Turning now to FIG. 5, a diagram of a database is depicted in accordance with an illustrative embodiment. In this example, database 500 is a more detailed illustration of database 408 in FIG. 4. Database 500 in these examples contains process templates 502, activity templates 504, users 506, policies 508, task templates 510, processes 512, activites 514, and tasks 516.

Templates are used such that processes, activities, and tasks may be reused. For example, a "plan" activity template may have at least one approval step. Also, in a change management process, at least one task is required to notify users of changes that are planned. Another example of common tasks and templates is that all documents are followed by at least one approval task. With a "review enclosed" activity in a change management process, this type of activity is assigned to a change submitter in these examples.

Activity templates 504 contain tasks for an activity. Each activity template within activity templates 504 contains a set of one or more tasks. In these examples, the tasks are selected or obtained from task templates 510. This component defines tasks be selected to make up an activity template. These tasks may be for an activity, such as, for example, installation of a software patch. Another example of an activity template is installation of a printer driver. The activity template for installation of patch contains tasks that are used to install the patch.

Process templates 502 contains activity templates. Each process template contains one or more activity templates. The set of activities are used to reach a goal, such as installation of a computer in a network. The installation of the computer may include activities, such as, for example, installing a printer driver, installing a patch to an operating system, and setting up a user for the computer. These templates become processes and activities when an actual instance of the activity making up the process or the task making up the activity is created.

Users 506 are identifications of different users who may perform or modify tasks. This information is used to authenticate user and identify tasks for users. For example, a user may be a process owner or activity owner as described above.

In these examples, policies 508 are a set of rules and data used to determine whether a particular task or activity is mandatory. If a task or activity is considered mandatory using policies 508, a user may not skip or delete the task in these illustrative examples. Additionally, these policies also may determine whether a task may be modified. For example, although a task may not be skipped, the user may be able to assign the task to a different user. Depending on the particular policy within policies 508, the user also may not be able to delegate a particular task. Further, one user may be able to delete or skip a task while another user may not. The same policy may be applied for whether a task may be delegated in these examples.

In these examples, a mandatory policy may also contain which the fields of a task can be modified by each user. In addition, based on previous task outcomes, a task can become mandatory. For example, if one of the approvals have failed, the other two approvals can become mandatory.

In other words, policies 508 are used to determine various potential modifications to tasks, such as when, how, who, and whether a task may be modified or deleted.

As another example, an activity may include two approval tasks in addition to various tasks used to install software. A experienced technical user may be allowed to skip one of the approval tasks while another user, who is less experienced, may not skip that task. In yet another example, a task may call for testing of software using a particular set of tasks. One user may be allowed to modify those tests and select different tests, while another user may not deviate from the tests delineated in the task. These types of changes and deletions of tasks are provided as illustrative examples and not meant to limit the manner in which tasks may be modified or changed.

Process templates 502, activity templates 504, and task templates 510 are stored in database 500 in the form of tables. Each table has an entry identifying an activity or a task as well as other information relating to that activity or task. Of course, depending on the particular implementation, these different entries may be stored using other types of data structures. For example, the different entries may be stored using link lists or arrays with pointers to entries.

Processes 512 are processes that are active. Activities 514 are activities that have been instantiated from templates for one or more processes, such as processes 512. Tasks 516 are the tasks that have been instantiated from task templates 510 for activities 514 in these examples.

Figure 6:
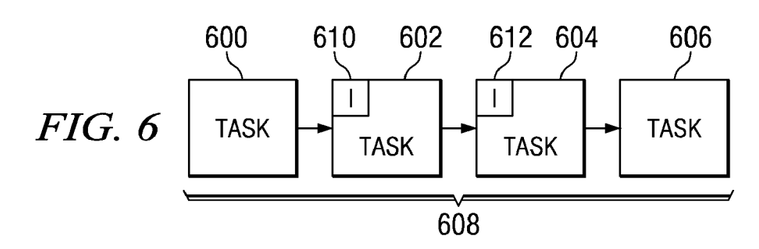
FIG. 6 is a diagram illustrating a set of tasks in accordance with an illustrative embodiment.

Turning now to FIG. 6, a diagram illustrating a set of tasks is depicted in accordance with an illustrative embodiment. In these examples, a set of tasks may be one or more tasks. As illustrated, tasks 600, 602, 604, and 606 form an activity 608. These tasks are initiated by a flow engine, such as flow engine 406 on process server 400 in FIG. 4. As illustrated, task 602 and task 604 are marked as mandatory in these examples using indicators 610 and 612, respectively. This type of marking indicates that some constraint is present on tasks 602 and 604. These constraints may be present for all users or some subset of users.

For example, task 602 and task 604 may be a set of approval steps. Depending on the particular user, these approval steps must be performed in contrast to task 600 and 606. If those tasks are not marked as mandatory using indicators 610 and 612, they may be deleted or skipped by the user assigned activity 608. As another example, task 602 and task 604 may be verification steps used to verify that certain components have been installed on a computer system. An experienced technician may be allowed to skip task 604, while an inexperienced technician is required to perform both task 602 and task 604.

In another example, one user may be able to delegate tasks 602 and 604, while another user may only be able to delegate task 604. In both cases, the tasks must be performed, and only who performs the tasks may be changed. Other changes that may be limited include completion dates for the tasks.

Figure 7:
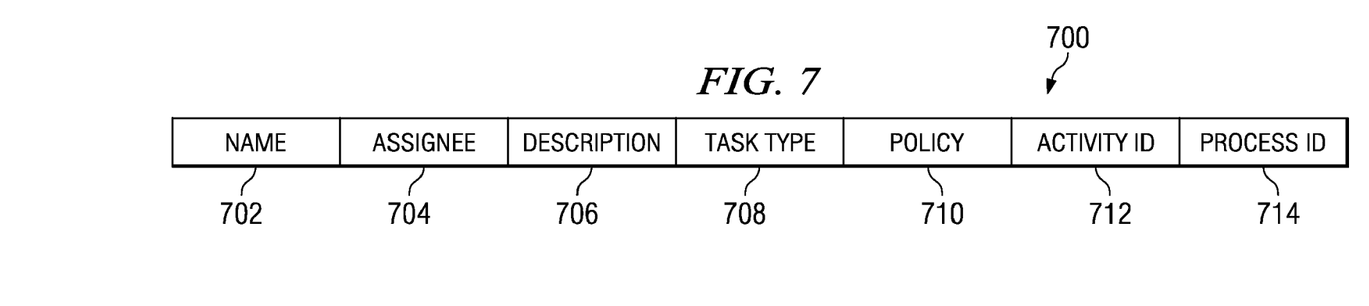
FIG. 7 is a diagram illustrating an entry in a template in accordance with an illustrative embodiment.

Turning now to FIG. 7, a diagram illustrating an entry in a task template is depicted in accordance with an illustrative embodiment. In this example, entry 700 contains the following fields: name 702, assignee 704, description 706, task type 708, policy 710, activity ID 712, and process ID 714.

Name 702 identifies the name of a task that is to be performed. This field is modifiable for non-mandatory tasks. The name in name 602 is made non-modifiable in these examples for mandatory tasks to allow the process owner an ability to audit whether or not a particular mandatory task has been completed as specified. Changing the name would change the task to be performed in these examples. Assignee 704 identifies the user assigned to the task. Description 706 is a short description of the task that is to be performed. This description is used in presenting the task to the user.

Task type 708 determines what user interface will be presented when the user assigned to the task selects the task from the list to begin work. For example, if the task is an approval task, the user interface for approvals will be presented to the user.

Policy 710 is used to identify a policy to be applied to task 700. Policy 710 corresponds to indicator 610 or 612 in FIG. 6. For example, policy 710 may be a single bit to indicate whether the task is mandatory or not. Depending on the particular implementation, policy 710 may point to a particular rule used to identify users who may or may not change task 700 and what changes may or may not be made to task 700. Alternatively, the rule may apply to all users who perform this task, Typically, mandatory tasks cannot be removed by anyone other than the process owner, who has decided that a task is no longer necessary for business-wide process compliance. These types of tasks are completed as part of an activity or process. Users, such as activity owners, however, are free to add as many additional tasks as required in these examples. Users in an organization may modify any aspect of a task that will help accomplish the task. For example, assigning the task to an owner.

Activity ID 712 links task 700 back to the parent activity. In other words, activity ID 712 identifies the activity to which task 700 belongs. Process ID 714 identifies the parent process. This ID is used to identify the process to which task 700 is located.

The fields shown in the illustrative example for task 700 are fields normally used for tasks except for policy 710. Policy 710 is added to task 700 to indicate whether a policy should be applied and what policy should be applied to task 700 in these examples. Also, entries for an activity may be implemented using the same types of fields with task type 708 being changed to contain the activity type and with the removal of activity ID 712.

Figure 8A:
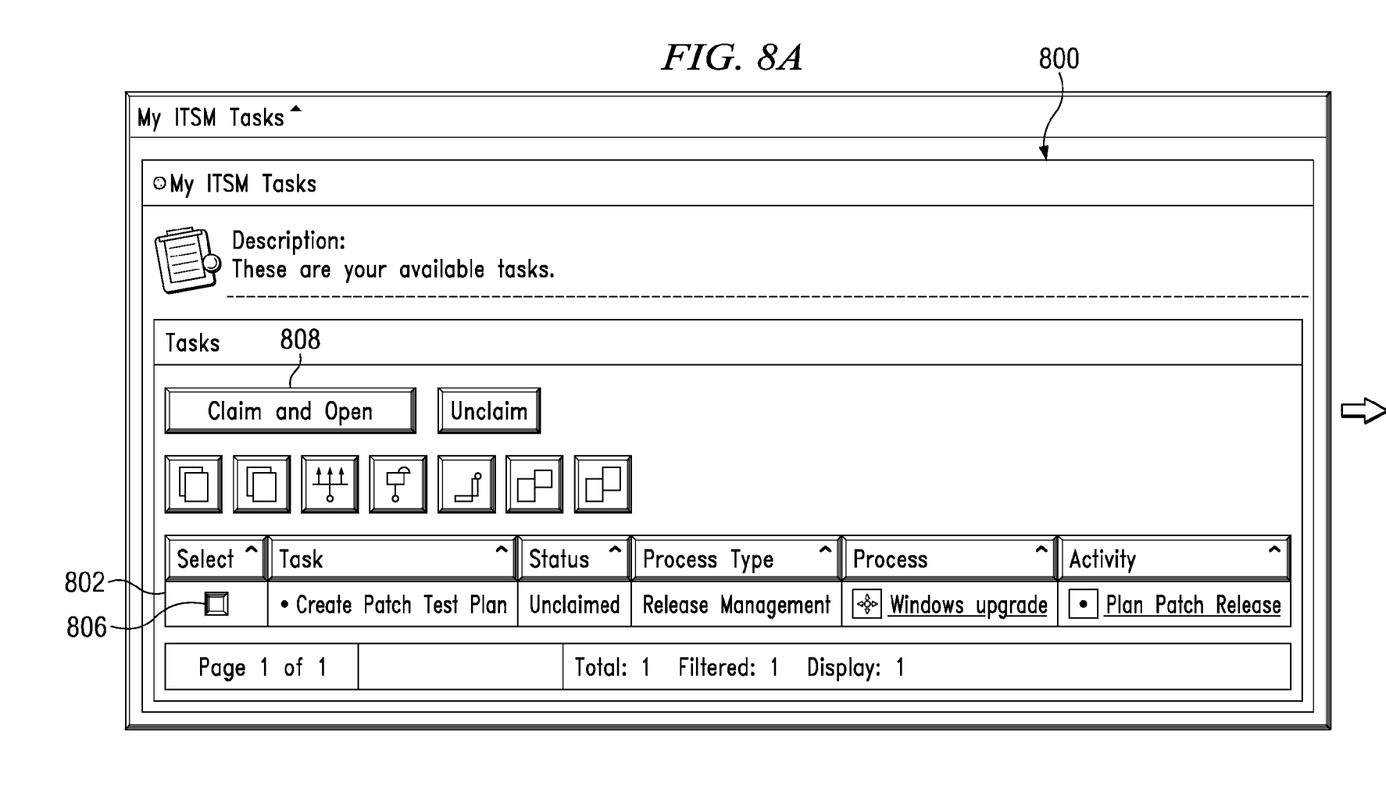
FIGS. 8A and 8B are diagrams illustrating user interfaces for working with tasks in accordance with an illustrative embodiment.
Figure 8B:
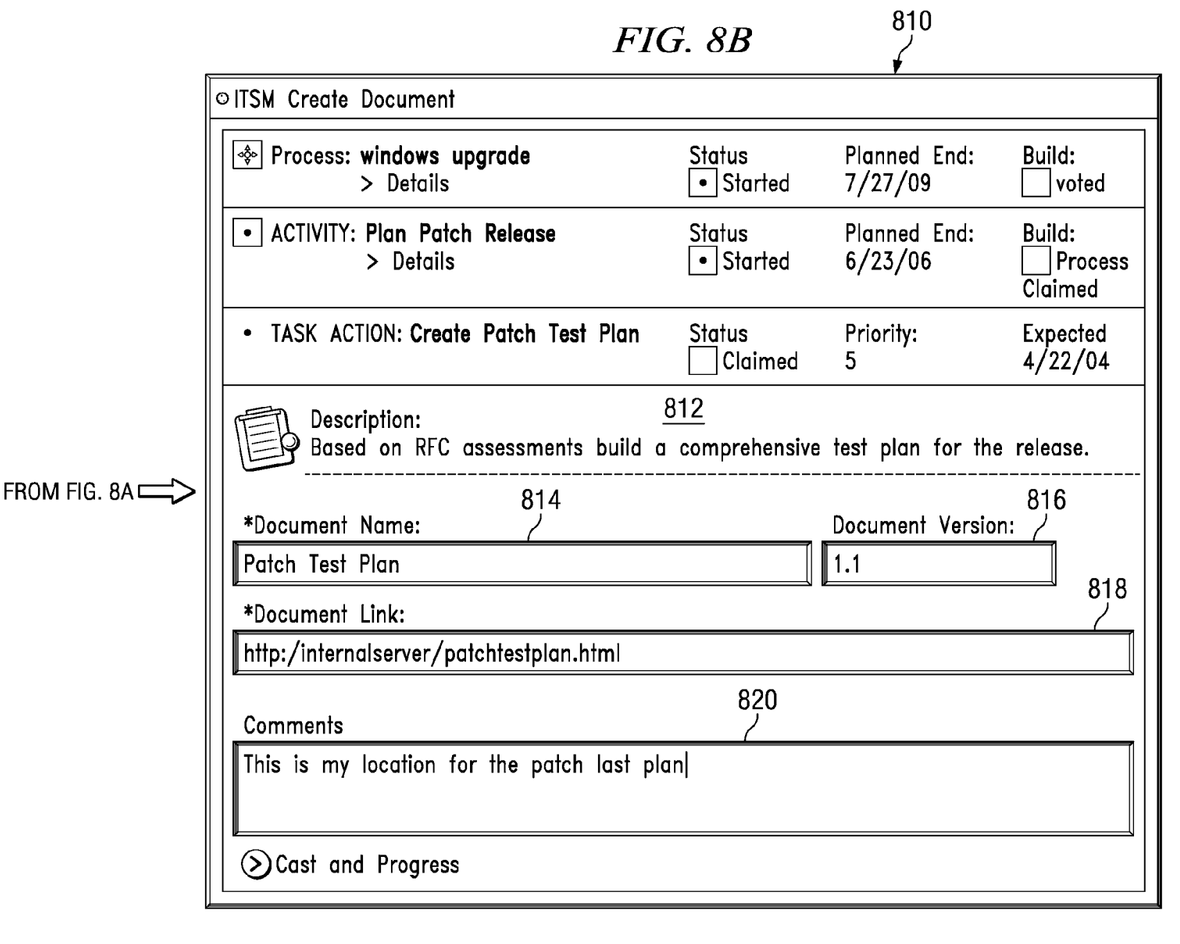

Turning now to FIGS. 8A and 8B, diagrams illustrating user interfaces for working with tasks are depicted in accordance with an illustrative embodiment. User interface 800 is an example of a Web page, such as Web page 412 in FIG. 4. In this example, the user has a task as shown in section 802. A single task is present in this example. The user may select task 804 by selecting checkbox 806. With the selection of task 802, the user may then select "claim and Open" button 808. Selection of this button causes a portlet to pop up for completion of a task. This portlet is shown as interface 810 in this example. In this case, task 802 is for a document task. In other words, the user is to create a document regarding a comprehensive test plan in this example as identified as the task action in section 812 of interface 810.

In this example, the user enters the document name in section 814 with a version number in section 816. A location of the document is entered into section 818 along with any comments in section 820 of interface 810. When the user completes task 802. This task is removed from user interface 800.

Figure 9A:
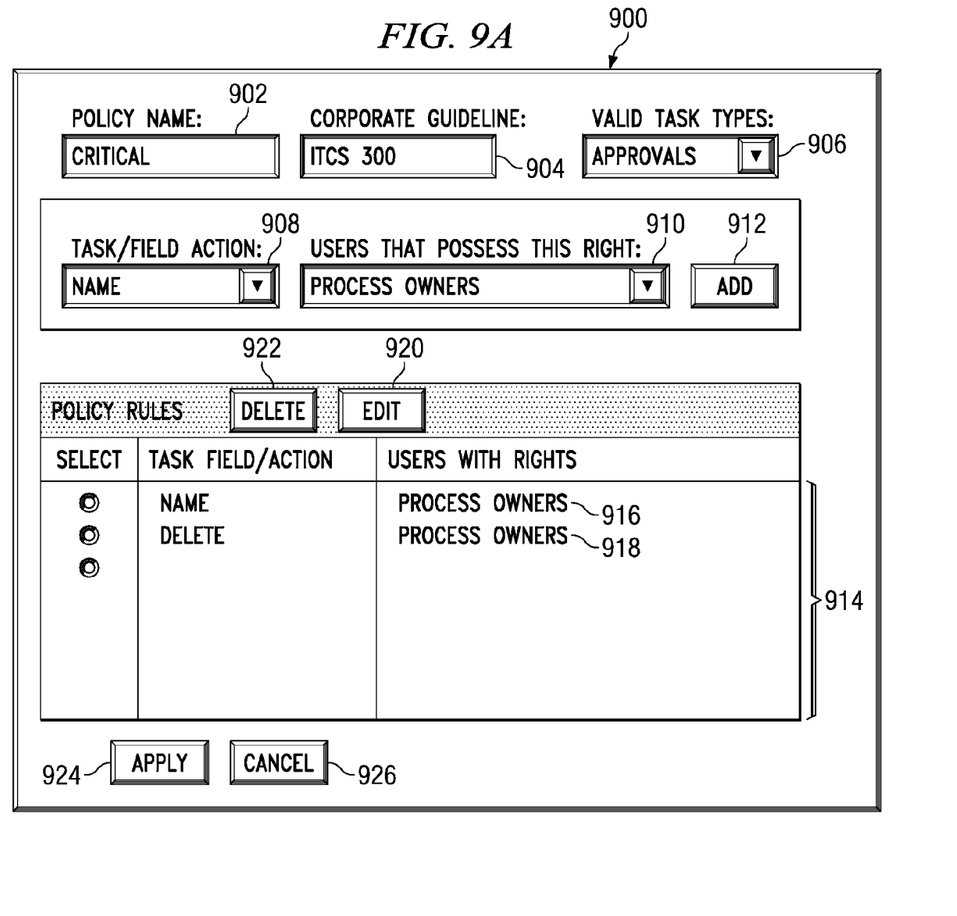
FIGS. 9A and 9B are diagrams illustrating interfaces for creating a policy in accordance with an illustrative embodiment.
Figure 9B:
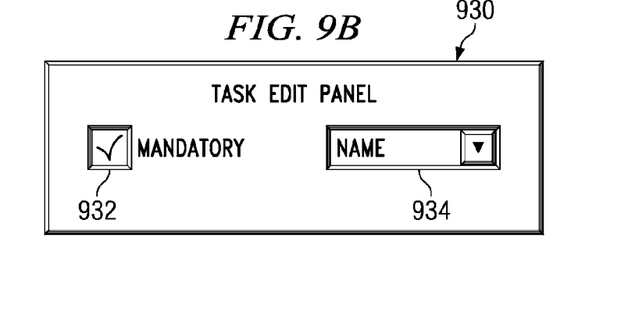

Turning now to FIGS. 9A and 9B, diagrams illustrating interfaces for creating a policy are depicted in accordance with an illustrative embodiment. In this example, interface 900 is used to create a mandatory task editing policy and associate this policy with a particular task. In this example, the name of the policy is critical as shown in field 902. An identification of a corporate guideline or other standard may be standard in field 904. The user may select from valid task types using control 906. Control 906 provides a drop down menu that lists various types of tasks. In this example, "approvals" are listed as a type of task for control 906. The particular task field or action is identified in control 908. This control identifies the field that may be modified or the action that can be performed on a task. Control 910 allows for the user to select which users may possess rights to the task. This drop down menu provided by control 910 provides selections for identifying which users have an ability to modify a selected field. For example, with critical tasks as illustrated in these figures, only process owners are able to modify a task name or delete a task. Although the examples are directed to a group or type of user, these policies may be applied to specific users rather than just groupings or types of users. The particular policy may be added by selecting add button 912.

Control 908 allows the user to take various actions on a particular task. For example, the user may name or delete a task depending on the action allowed in the policy being created though interface 900.

In this example, the current policies named as critical and the various actions that may be taken are shown in entries 916 and 918. For a critical policy, process owners may name and delete a task. These particular rules may be edited by selecting edit button 920 or deleted by selecting delete 922. Editing of a rule brings up the current values for field 902, field 904, control 906, control 908, and control 910.

When all of the different rules have been added for these rules may be stored by selecting apply button 924. If the rules that have been added are not to be stored, cancel button 926 is selected. In these examples, the rules in entries 916 and 918 make up a policy called "critical". This policy name is depicted in field 902.

In FIG. 9B, task edit panel 930 allows a user to determine whether a task is to be mandatory using checkbox 932. This checkbox allows for a policy to be applied to a task. In this example, control 934 allows a user to select a policy from a set of policies through a menu presented through control 934. The policy may be one defined using interface 900 in FIG. 9A.

Figure 10A:
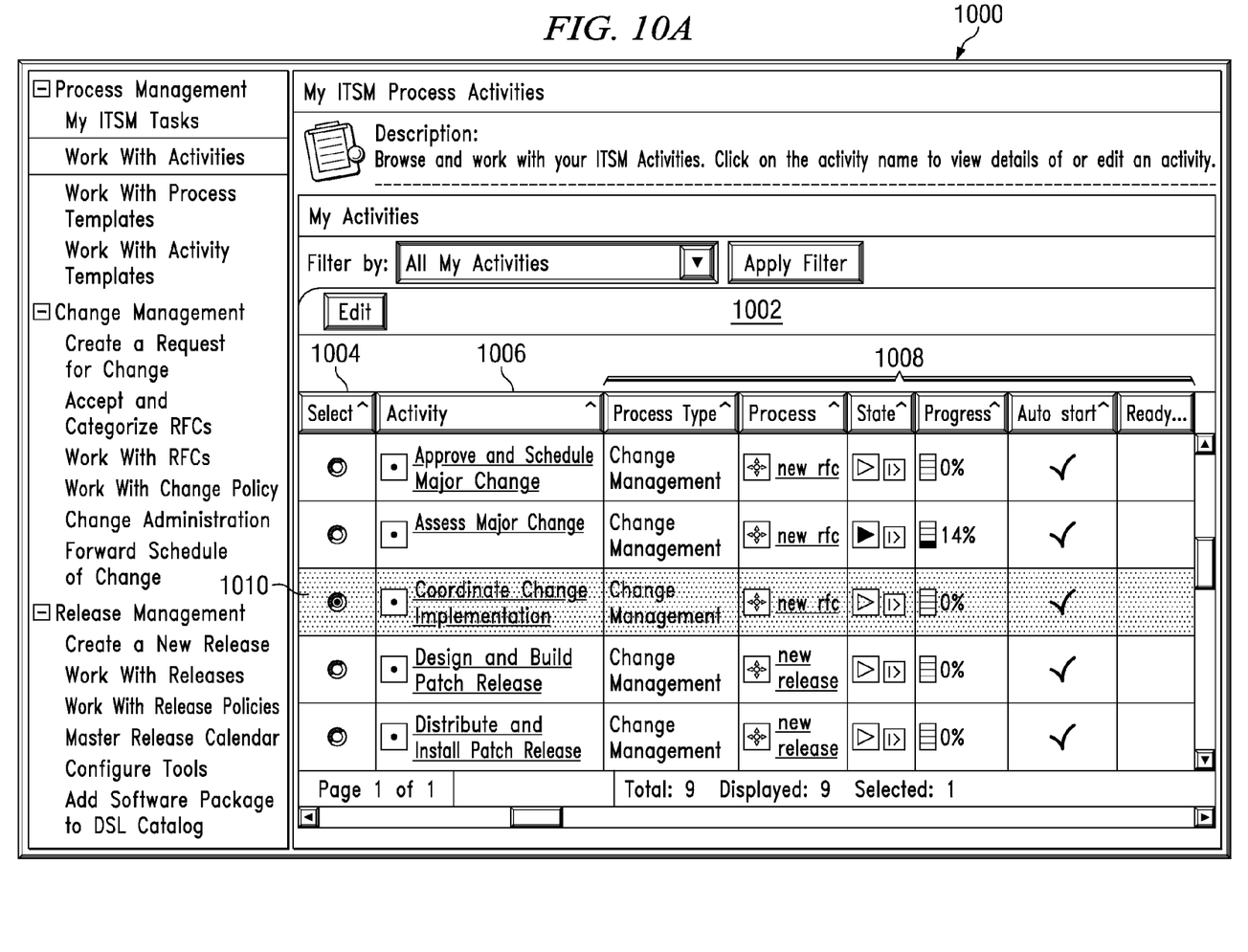
FIGS. 10A-10C are diagrams illustrating user interfaces for editing an activity in accordance with an illustrative embodiment.
Figure 10B:
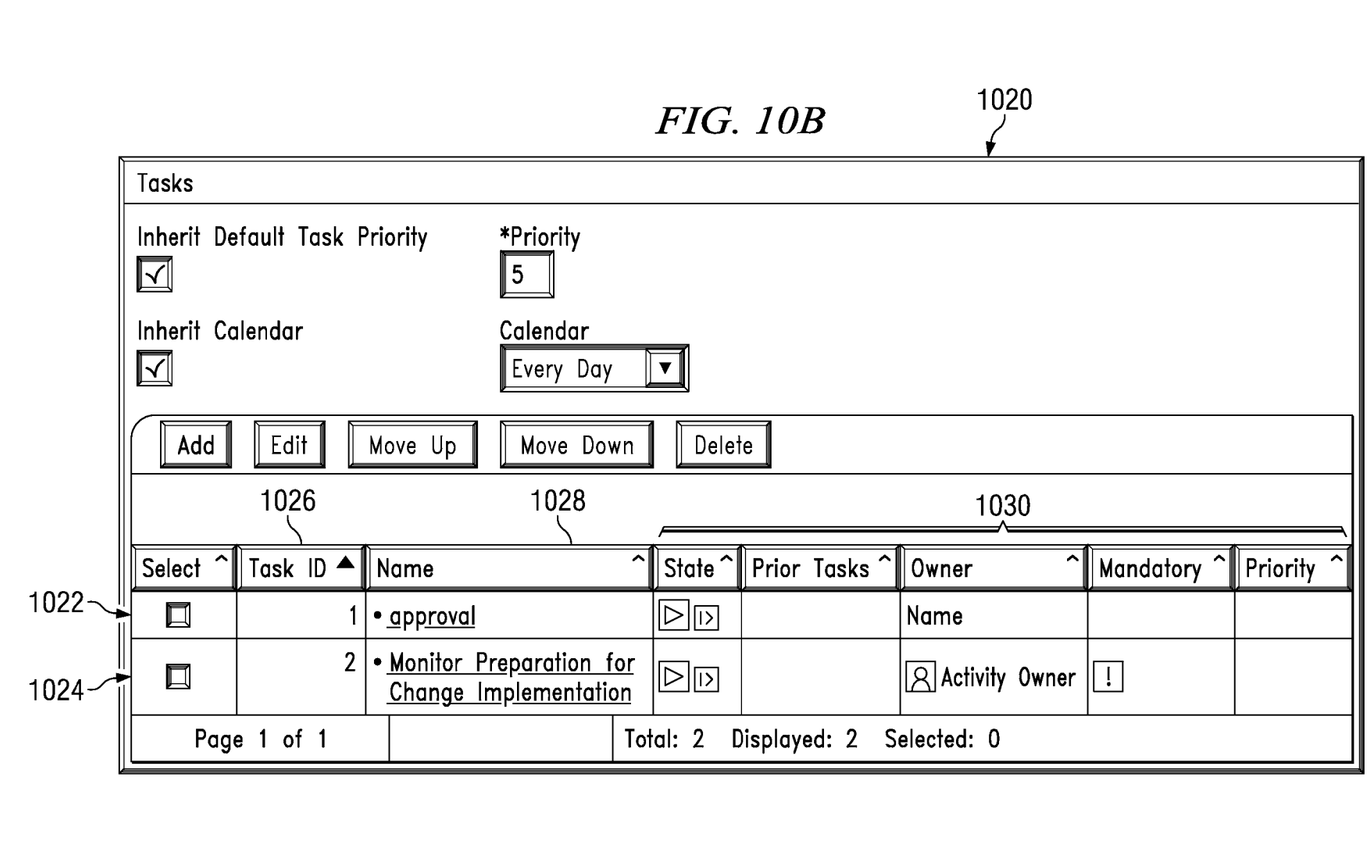
Figure 10C:
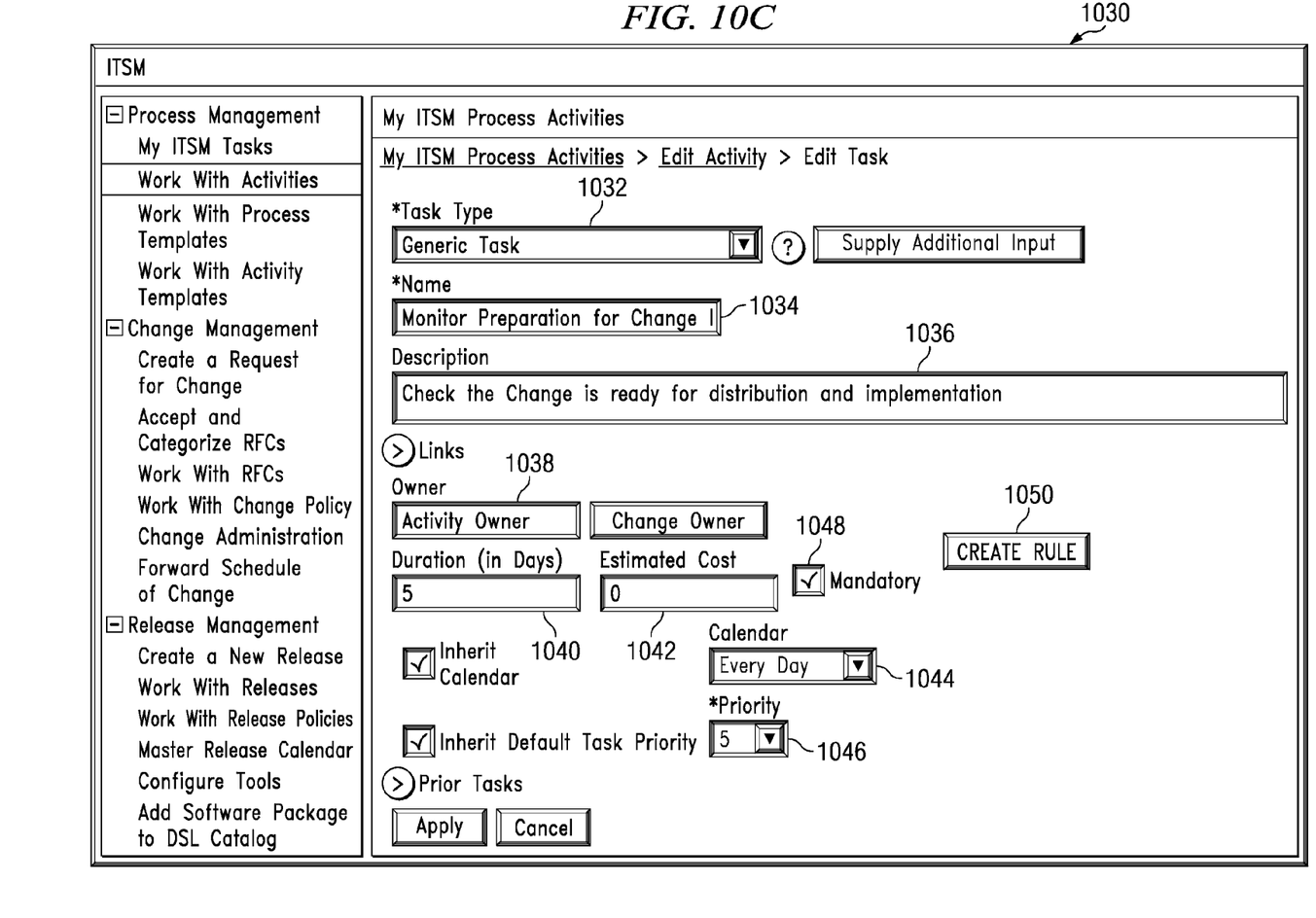

Turning now to FIGS. 10A-10C, diagrams illustrating user interfaces for editing an activity are depicted in accordance with an illustrative embodiment. In FIG. 10A, interface 1000 is an example of a Web page, such as Web page 412 in FIG. 4. In this example, a to-do list or list of activities is found in section 1002. This to-do list is an example of to-do list 414 in FIG. 4. Section 1002 allows a user, such as an activity owner, to select an activity in column 1004. The name of the activity is found in column 1006. Other information about an activity is found in columns 1008.

In this example, the user has selected entry 1010. In response to selecting this entry, a list of tasks is presented as shown in user interface 1020 in FIG. 10B. Also, in this depicted example, the user is a process owner that may define or change tasks. Two tasks are present for the selected activity in entry 1010. The tasks are shown in entry 1022 and 1024. Each task is identified by task ID in column 1026 and a name in column 1028. Other information about the tasks is found in columns 1030. In this example, the user has selected entry 1024.

Selection of this entry results in user interface 1030 in FIG. 10C being presented. In this example, user interface 1030 presents information and fields about the monitor preparation for change implementation task in entry 1024. User interface 1030 contains task type field 1032, name field 1034, description field 1036, owner field 1038, duration field 1040, estimated cost field 1042, calendar field 1044, priority field 1046, checkbox 1048, and create rule field 1050.

In this illustrative example, the task is marked as mandatory using checkbox 1048. In other words, the task is mandatory. In the implementation of which a single bit is used to indicate whether a task is mandatory or not, the task must be performed and cannot be deleted. Depending on the particular implementation, a code may be entered into a field for more complex processing of the task in terms of how and who can modify this task. This information may be entered into a screen when create rule 1050 is selected. By selecting this particular option, the user may create or select a pre-existing rule to handle how the task may or may not be modified.

Codes or bits entered by a user may be stored in a field in an entry for the task, such as policy 710 in FIG. 7. The rules may be selected from those found in policies 508 in FIG. 5. If the user creates a new rule, that rule also may be stored in policies 508 in FIG. 5.

Figure 11:
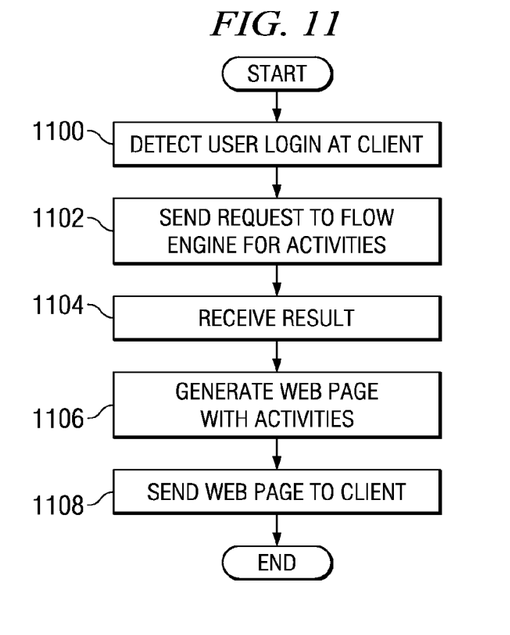
FIG. 11 is a flowchart illustrating a process for presenting activities to a user in accordance with an illustrative embodiment.

Turning now to FIG. 11, a flowchart illustrating a process for presenting activities to a user is depicted in accordance with an illustrative embodiment. In these examples, the process depicted in FIG. 11 may be implemented in an administrative portlet, such as one found in administrative portlets 410 in FIG. 4.

The process begins by detecting a user login at a client (step 1100). This login may be, for example, the user logging into the system or sending a request to the portal server. After detecting the user login, the process sends a request to a flow engine to identify activities for the user (step 1102). In these examples, the flow engine is flow engine 406 in process server 400 in FIG. 4. A result is received in response to the request (step 1104).

Thereafter, the process generates a Web page containing the activities identified for the user (step 1106). Thereafter, the completed Web page is sent to the client for presentation (step 1108) with the process terminating thereafter.

Figure 12:
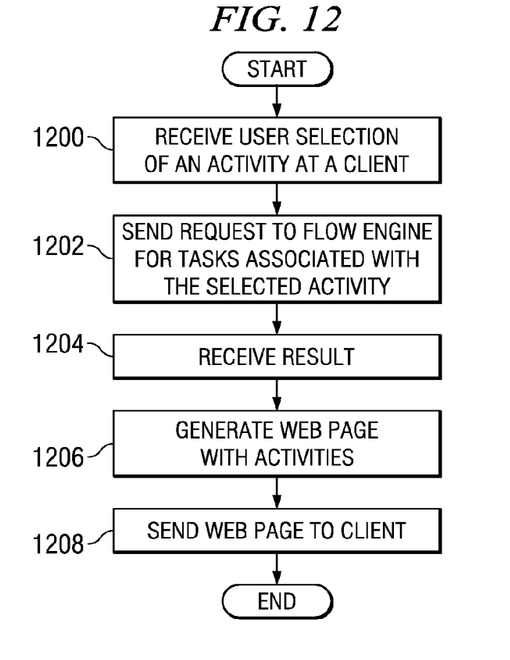
FIG. 12 is a flowchart illustrating a process for presenting tasks to a user in accordance with an illustrative embodiment.

Turning now to FIG. 12, a flowchart illustrating a process for presenting tasks to a user is depicted in accordance with an illustrative embodiment. In these examples, the process illustrated in FIG. 12 may be implemented in a administrative portlet, such as one found in administrative portlets 410 in FIG. 4.

The process begins by receiving a user selection of an activity at a client (step 1200). In response to receiving the selection by the user, a request is sent to a flow engine to identify tasks associated with the selected activity (step 1202). A result to the request is received (step 1204). In response to receiving the result, a Web page is generated with a list of tasks identified for the activity (step 1206). Thereafter, the completed Web page is returned to the client (step 1208) with the process terminating thereafter.

Figure 13:
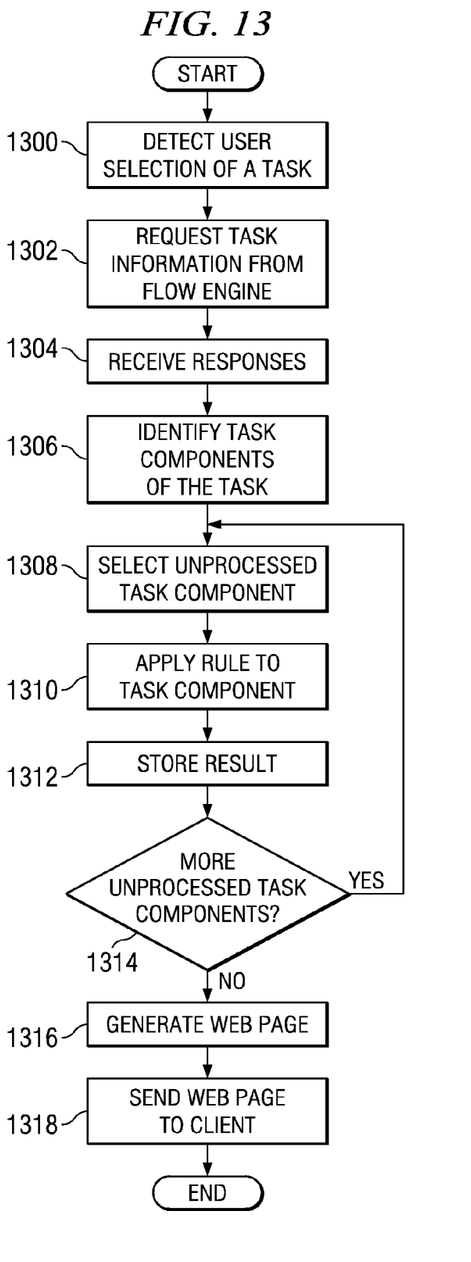
FIG. 13 is a flowchart of a process for presenting a task to a user for processing in accordance

Turning now to FIG. 13, a flowchart of a process for presenting a task to a user for processing is depicted in accordance with an illustrative embodiment. The process illustrated in FIG. 13 may be implemented by an administrative portlet, such as one found in administrative portlets 410 in FIG. 4.

The process begins by detecting a user selection of a task (step 1300). Thereafter, the process requests task information from a flow engine (step 1302). Thereafter, a response is received (step 1304). The process then identifies task components for the task (step 1306). These task components, in these examples, are different fields that may or may not be changed for the task component depending on the particular policy that is being applied to the task. Thereafter, the process selects an unprocessed component for processing (step 1308). A rule received with the task information is applied to the task component (step 1310). The result of the application of the rule is stored (step 1312).

Next, a determination is made as to whether more unprocessed task components are present (step 1314). If additional unprocessed components are present, the process returns to step 1308.

Otherwise, the process generates a Web page using the stored results and the task information (step 1316). The process then sends the completed page to the client (step 1318) with the process terminating thereafter.

In step 1310, the rule applied to a particular component is used to determine whether that component is changeable by the user. If the task is a mandatory task, that cannot be changed by the user performing the task. Also, certain task components may be modified while others cannot. For example, a task component allowing delegation of ownership of the task to another person may be modified, while actually removing or deleting the task may not occur. Another task component that may be modified is the date of completion for a task. With the evaluation of a task to a task editing policy, the modification of the user interface is modified based on the results. For example, if a field is not editable, that field is marked as read only. These results are used to generate a page to send to the user. Thus, depending on the results of applying the policy in step 1310, certain task components may be modifiable by the user, while others may not.

The present invention provides a computer implemented method, apparatus, and computer usable program product for processing tasks. A set of tasks is presented on a user interface. Responsive to a request to modify a task, a determination is made as whether the task can be modified based on a policy associated with the task. The request to modify the task is performed if a determination is made that the task can be modified.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing tasks, the computer implemented comprising:
   presenting a set of tasks on a user interface, wherein the set of tasks are part of a process;
   associating a set of policies, each respective policy associated with one or more of the set of tasks, wherein at least one of the set of tasks is associated with a policy restricting modification of the task;
   sending the set of tasks and set of policies to a flow engine, wherein the flow engine enforces performance of the set of tasks according to the set of policies;
   responsive to a request to modify a task, determining whether the task can be modified based on a policy associated with the task;
   responsive to a determination that the task can be modified, performing the request to modify the task;
   storing templates for the tasks in a database;
   storing policies for determining whether the tasks can be modified; and
   instantiating a new set of tasks using the templates and the policies, wherein the new set of tasks is for a different process.

2. The computer implemented method of claim 1, wherein performing the request to modify the task comprises:
   associating a new policy with the task in place of the policy.

3. The computer implemented method of claim 1, wherein performing the request to modify the task comprises:
   deleting the task.

4. The computer implemented method of claim 1, wherein performing the request to modify the task comprises:
   delegating the task to a user.

5. The computer implemented method of claim 1, wherein performing the request to modify the task comprises:
   changing a completion date for the task.

6. The computer implemented method of claim 1, wherein presenting a set of tasks on a user interface comprises:
   placing the set of tasks in a list on a Web page; and
   sending the Web page to a browser.

7. The computer implemented method of claim 1, wherein determining whether the task can be modified based on a policy associated with the task comprises:
   identifying a policy identifier for the task;
   locating the policy for the task from using the identifier; and
   processing the policy to obtain a result identifying whether the task can be modified.

8. The computer implemented method of claim 1, wherein the policy specifies that only a selected set of users can modify the task.

9. A computer implemented method for managing process compliance, the computer implemented method comprising:
   responsive to detecting a user selection of a task from a set of tasks to form a selected task, determining whether the selected task is modifiable for a particular user based on a policy, wherein at least some tasks in the set of tasks are associated with a policy restricting modification, wherein the set of tasks are part of a computer process, wherein the selected task comprises a first section that is modifiable by the particular user and a second section that is unmodifiable by the particular user;
   responsive to a determination that the selected task is modifiable for the particular user, creating an interface allowing the particular user to modify the selected task, wherein the interface is a Web page; and
   presenting the interface to the particular user.

10. An apparatus for managing tasks comprising:
    a process server comprising a flow engine, wherein the process server stores tasks for users, templates for the tasks, and a set of policies for determining whether the tasks can be modified, wherein the flow engine enforces performance of the tasks according to the set of policies; and
    a portal server, wherein portal server retrieves a set tasks for a user, generates a first Web page to present the set of tasks, sends the presentation to the user, determines whether any components of a selected task in the set of tasks can be modified based on a policy associated with the task in response to selection of a task in the set of tasks, and generates a second Web page containing one or more task components of the selected task that can be modified based on the policy, and sends the second Web page to the user.

11. A non-transitory computer usable storage medium having computer usable program code stored thereon for processing tasks, the non-transitory computer usable storage medium comprising:
    computer usable program code for presenting a set of tasks on a user interface, wherein the set of tasks are part of a process;
    computer usable program code for associating a set of policies, each respective policy associated with one or more of the set of tasks, wherein at least one of the set of tasks is associated with a policy restricting modification of the task;

computer usable program code for sending the set of tasks and set of policies to a flow engine, wherein the flow engine enforces performance of the set of tasks according to the set of policies;

computer usable program code, responsive to a request to modify a task, determining whether the task can be modified based on a policy associated with the task;

computer usable program code, responsive to a determination that the task can be modified, performing the request to modify the task;

computer usable program code for storing templates for the tasks in a database;

computer usable program code for storing policies for determining whether the tasks can be modified; and computer usable program code for instantiating a new set of tasks using the templates and the policies, wherein the new set of tasks is for a different process.

12. The non-transitory computer usable storage medium of claim 11, wherein the computer usable program code for performing the request to modify the task in response to a determination that the task can be modified comprises:
computer usable program code for associating a new policy with the task in place of the policy.

13. The non-transitory computer usable storage medium of claim 11, wherein the computer usable program code for performing the request to modify the task in response to a determination that the task can be modified comprises:
computer usable program code for deleting the task.

14. The non-transitory computer usable storage medium of claim 11, wherein the computer usable program code for performing the request to modify the task in response to a determination that the task can be modified comprises:
computer usable program code for delegating the task to a user.

15. The non-transitory computer usable storage medium of claim 11, wherein the computer usable program code for performing the request to modify the task in response to a determination that the task can be modified comprises:
computer usable program code for changing a completion date for the task.

16. The computer program product non-transitory computer usable storage medium of claim 11, wherein the computer usable program code for presenting a set of tasks on a user interface comprises:
computer usable program code for placing the set of tasks in a list on a Web page; and
computer usable program code for sending the Web page to a browser.

17. The non-transitory computer usable storage medium of claim 11, wherein the computer usable program code for determining whether the task can be modified based on a policy associated with the task comprises:
computer usable program code for identifying a policy identifier for the task;
computer usable program code for locating the policy for the task from using the identifier; and
computer usable program code for processing the policy to obtain a result identifying whether the task can be modified.

18. The non-transitory computer usable storage medium of claim 11, wherein the policy specifies that only a selected set of users can modify the task.

19. A data processing system comprising:
a bus;
a communications unit connected to the bus;
a storage device connected to the bus, wherein the storage device includes computer usable program code; and
a processor unit connected to the bus, wherein the processor unit executes the computer usable program code to present a set of tasks on a user interface, wherein the set of tasks are part of a process; associate a set of policies, each respective policy associated with one or more of the set of tasks, wherein at least one of the set of tasks is associated with a policy restricting modification of the task; send the set of tasks and set of policies to a flow engine, determine whether the task can be modified based on a policy associated with the task in response to a request to modify a task; perform the request to modify the task in response to a determination that the task can be modified, store templates for the tasks in a database; store policies for determining whether the tasks can be modified; and instantiate a new set of tasks using the templates and the policies, wherein the new set of tasks is for a different process, and wherein the flow engine enforces performance of the set of tasks according to the set of policies.

20. The data processing system of claim 19, wherein in executing the computer usable program code to perform the request to modify the task in response to a determination that the task can be modified, the processor executes the computer usable program code to associate a new policy with the task in place of the policy.

21. The data processing system of claim 19, wherein executing the computer usable program code to perform the request to modify the task in response to a determination that the task can be modified, the processor executes the computer usable program code to delete the task.

22. The data processing system of claim 19, wherein executing the computer usable program code to perform the request to modify the task in response to a determination that the task can be modified, the processor executes the computer usable program code to delegate the task to a user.

23. The data processing system of claim 19, wherein executing the computer usable program code to perform the request to modify the task in response to a determination that the task can be modified, the processor executes the computer usable program code to change a completion date for the task.

24. The data processing system of claim 19, wherein in executing the computer usable program code to present a set of tasks on a user interface, the processor executes the computer usable program code to place the set of tasks in a list on a Web page; and send the Web page to a browser.

25. The data processing system of claim 19, wherein in executing the computer usable program code to determine whether the task can be modified based on a policy associated with the task, the processor executes the computer usable program code to identify a policy identifier for the task; locate the policy for the task from using the identifier; and process the policy to obtain a result identifying whether the task can be modified.

26. The data processing system of claim 19, wherein the policy specifies that only a selected set of users can modify the task.

* * * * *